United States Patent
Murakami et al.

(10) Patent No.: US 8,787,984 B2
(45) Date of Patent: Jul. 22, 2014

(54) MOBILE ELECTRONIC DEVICE AND CONTROL METHOD FOR CHANGING SETTING OF LOCKED STATE ON TOUCH SCREEN DISPLAY

(75) Inventors: Hideko Murakami, Yokohama (JP); Atsuo Chiba, Yokohama (JP)

(73) Assignee: Kyocera Corporation, Kyoto (JP)

( * ) Notice: Subject to any disclaimer, the term of this patent is extended or adjusted under 35 U.S.C. 154(b) by 11 days.

(21) Appl. No.: 13/564,923

(22) Filed: Aug. 2, 2012

(65) Prior Publication Data
US 2013/0035141 A1   Feb. 7, 2013

(30) Foreign Application Priority Data
Aug. 3, 2011   (JP) .................. 2011-170548

(51) Int. Cl.
*H04M 1/00* (2006.01)
*G06F 3/041* (2006.01)

(52) U.S. Cl.
USPC ......................................... 455/566; 455/411

(58) Field of Classification Search
USPC ................................. 455/566, 411
See application file for complete search history.

(56) References Cited

U.S. PATENT DOCUMENTS

| 2005/0152111 | A1* | 7/2005 | Skurdal et al. | 361/686 |
|---|---|---|---|---|
| 2010/0211915 | A1 | 8/2010 | Sawai | |
| 2011/0088086 | A1* | 4/2011 | Swink et al. | 726/7 |
| 2012/0047566 | A1* | 2/2012 | Andersson | 726/7 |
| 2012/0184247 | A1* | 7/2012 | Choe et al. | 455/411 |
| 2012/0208501 | A1* | 8/2012 | Tsuda | 455/411 |
| 2012/0280917 | A1* | 11/2012 | Toksvig et al. | 345/173 |

FOREIGN PATENT DOCUMENTS

| JP | 2008182469 A | 8/2008 |
|---|---|---|
| JP | 2010039772 A | 2/2010 |

* cited by examiner

*Primary Examiner* — Jinsong Hu
*Assistant Examiner* — Jean Chang
(74) *Attorney, Agent, or Firm* — Lowe Hauptman & Ham, LLP

(57) ABSTRACT

According to an aspect, a mobile electronic device includes a display unit, an operating unit, and a control unit. The display unit displays a lock screen in a first locked state. The operating unit receives an input of an operation. The control unit cancels the first locked state when an input of a first operation is detected through the operating unit while the lock screen is displayed on the display unit, and enters a second locked state when an input of a second operation is detected through the operating unit while the lock screen is displayed on the display unit.

15 Claims, 7 Drawing Sheets

MOBILE ELECTRONIC DEVICE AND CONTROL METHOD FOR CHANGING SETTING OF LOCKED STATE ON TOUCH SCREEN DISPLAY

CROSS-REFERENCE TO RELATED APPLICATIONS

This application claims priority from Japanese Application No. 2011-170548, filed on Aug. 3, 2011, the content of which is incorporated by reference herein in its entirety.

BACKGROUND

1. Technical Field

The present disclosure relates to a mobile electronic device, a control method, and a storage medium storing a control program.

2. Description of the Related Art

In recent years, touch panel devices such as smart phones have been prevalent (see Japanese Patent Laid-open Application No. 2010-39772). The touch panel devices have a function for locking the screen for the purpose of reducing false operation or unauthorized use by others (see Japanese Patent Laid-open Application No. 2008-182469).

Regarding the locked state of the screen, there are two kinds of locked states, one of which intends to reduce false operation and the other of which intends to reduce unauthorized use. Since the intended purposes are different between the locked state intended to reduce false operation and the locked state intended to reduce unauthorized use, their cancellation processes will be also different. Typically, the locked state intended to reduce false operation can be cancelled by easier operation than for the locked state intended to reduce unauthorized use.

In response to a setting operation that is made in a state where the locked state has been cancelled, the mobile electronic device switches that either one of the two locked states is executed, both are performed, or neither of them is performed. Therefore, in order to switch the setting of the locked state, the user has to make a plurality of operations such as cancelling the locked state and then opening the setting window to make an input of the setting operation, which makes the operation complicated.

For the foregoing reasons, there is a need for a mobile electronic device, a control method, and a control program that allow the user to switch the setting of the locked state with a simple operation.

SUMMARY

According to an aspect, a mobile electronic device includes a display unit, an operating unit, and a control unit. The display unit displays a lock screen in a first locked state. The operating unit receives an input of an operation. The control unit cancels the first locked state when an input of a first operation is detected through the operating unit while the lock screen is displayed on the display unit, and enters a second locked state when an input of a second operation is detected through the operating unit while the lock screen is displayed on the display unit.

According to another aspect, a control method is executed by a mobile electronic device including a display unit and an operating unit. The control method includes: displaying a lock screen on the display unit in a first locked state; detecting an operation through the operating unit while displaying the lock screen on the display unit; cancelling the first locked state when an input of a first operation is detected at the detecting; and entering a second locked state when an input of a second operation is detected at the detecting.

According to another aspect, a non-transitory storage medium stores a control program. When executed by a mobile electronic device including a display unit and an operating unit, the control program causes the mobile electronic device to execute: displaying a lock screen on the display unit in a first locked state; detecting an operation through the operating unit while displaying the lock screen on the display unit; cancelling the first locked state when an input of a first operation is detected at the detecting; and entering a second locked state when an input of a second operation is detected at the detecting.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the mobile electronic device; however, the present invention is not limited to mobile phones. Therefore, the present invention can be applied to a variety of mobile electronic devices, including but not limited to, personal handyphone systems (PHS), personal digital assistants (PDA), portable navigation units, personal computers (including but not limited to tablet computers, netbooks etc.), media players, portable electronic reading devices, and gaming devices.

Figure 1:
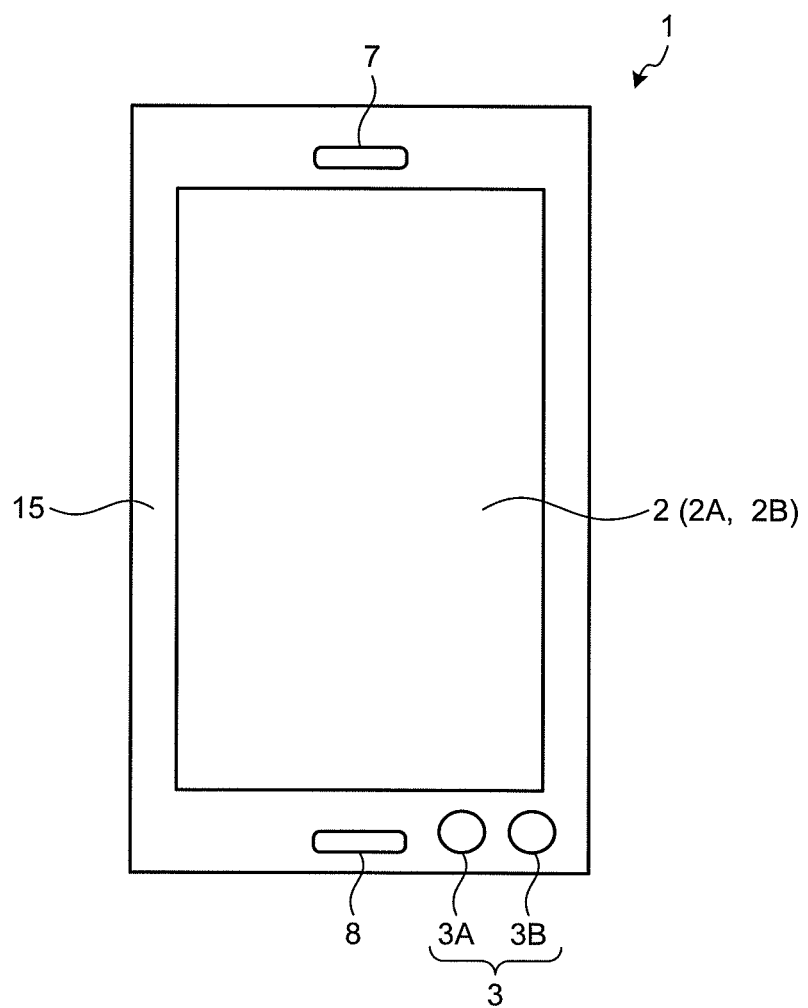
FIG. 1 is a front view of a mobile phone.

First of all, with referring to FIG. 1, described below will be the overall configuration of a mobile phone 1 according to an embodiment. FIG. 1 is a front view of the mobile phone. As illustrated in FIG. 1, the mobile phone 1 has a housing 15, and includes a touch panel 2 including a touch sensor 2A and a display unit 2B, an input unit 3, a receiver 7, and a microphone 8 on the surface of the housing 15.

On the mobile phone 1, as illustrated in FIG. 1, the touch panel 2, the input unit 3, the receiver 7, and the microphone 8 are arranged on the front of the housing 15. The touch panel 2 is disposed on the substantially entire region of the front of the housing 15. The input unit 3 and the microphone 8 are disposed at one end in the longitudinal direction of the front of the housing 15. The receiver 7 is disposed at the other end in the longitudinal direction of the front of the housing 15. That is, the receiver 7 and the microphone 8 are disposed at both ends in the longitudinal direction, respectively. The touch panel 2 is provided on the front of the housing 15 to display characters, graphics, images, and the like and detects a contact through which the mobile phone 1 determines various operations made to the touch panel 2 by using a finger, a stylus, a pen, and so on (in the description herein below, for the sake of simplicity, it is assumed that the user touches the touch panels with his/her finger(s)). The input unit 3 includes a plurality of buttons such as a first button 3A and a second button 3B to which predetermined functions are assigned.

Figure 2:
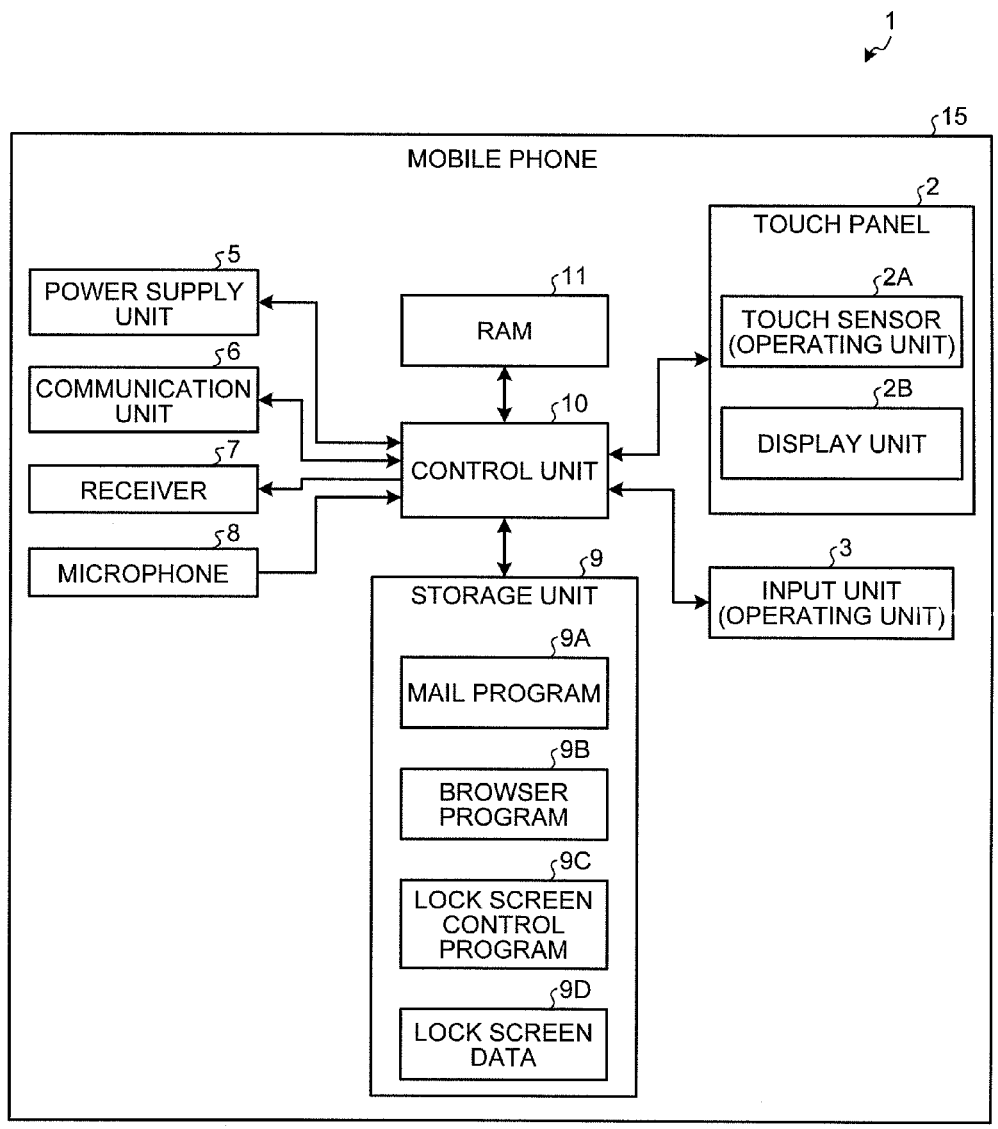
FIG. 2 is a block diagram of the mobile phone.

Then, with referring to FIG. 2, the functional configuration of the mobile phone 1 will be described below. FIG. 2 is a block diagram of the mobile phone 1. As illustrated in FIG. 2, the mobile phone 1 has the touch panel 2, the input unit 3, a power supply unit 5, a communication unit 6, the receiver 7, the microphone 8, a storage unit 9, a control unit 10, and a RAM (Random Access Memory) 11. It is noted that, in the present embodiment, the touch sensor 2A and the input unit 3 will be an operating unit.

The touch panel 2 has a first function of displaying various types of information such as characters, graphics, images, and so on. The touch panel 2 has a second function of detecting contact(s) with the certain area such as a displayed icon, a button, an area performed for inputting characters, and so on. The touch panel 2 is arranged with the touch sensor 2A and the display unit 2B overlapped. The touch sensor 2A and the display unit 2B may share a part of the component member.

The touch sensor 2A detects contact(s) with the surface of the touch panel 2 and outputs to the control unit 10 a signal according to the detected contact, whereby the control unit 10 determines an operation (gesture) performed for the touch panel 2. That is, the touch sensor 2A functions as the operating unit for receiving the input of the operation. Examples of the system by which the touch sensor 2A detects contact(s) include, but are not limited to, a capacitance system, a resistive film system, a surface acoustic wave system (or ultrasonic wave system), an infrared ray system, an electromagnetic induction system, a load detection system, etc. Examples of the operation determined through the touch sensor 2A include, but are not limited to, a tap operation, a double tap operation, a long tap operation, a sweep (swipe) operation, a flick operation, etc. In the present embodiment, the first operation and the second operation may include the tap operation, the double tap operation, the long tap operation, the sweep (swipe) operation, the flick operation, and so on.

The tap operation is an operation to cause the finger to contact with the touch panel 2 and, right after that, to remove it from the touch panel 2. The double tap operation is an operation to repeat twice the operation of causing the finger to contact with the touch panel 2 and, right after that, to remove it from the touch panel 2. The long tap operation is an operation to cause the finger to contact with the touch panel 2 and keep the finger in contact with the touch panel 2 for a certain length of time, and then to remove it from the touch panel 2. The sweep operation is an operation to cause the finger to move keeping the finger in contact with the touch panel 2. When some object displayed on the touch panel 2 moves in accordance with that operation, the sweep operation may also be called as a drag operation. The flick operation is an operation to cause the finger to contact with the touch panel 2 and then remove the finger while moving the finger in one direction at a higher speed so as to swiftly sweep it. In the following explanation, for the sake of simplicity of explanation, the fact that the touch sensor detects the contact(s) and then the control unit determines the type of the gesture as X based on the contact(s) may be simply described as "the mobile phone detects X", "the control unit detects X", "the touch sensor detects X", or "the touch panel detects X".

The display unit 2B may include a liquid crystal display (LCD), an organic electro-luminescence display (OELD), or an inorganic electro-luminescence display (IELD), and the like, to display characters, graphics, and the like. The display unit 2B displays various types of information according to the control signal inputted from the control unit 10.

The input unit 3 accepts the user's operation through a physical buttons and the like, and transmits to the control unit 10 a signal corresponding to the accepted operation, whereby the control unit 10 determines an operation performed for the input unit 3. That is, the input unit 3 functions as an operating unit for receiving the input of the operation. The power supply unit 5 supplies the power obtained from a battery or an external power supply to respective function units including the control unit 10 of the mobile phone 1.

The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The receiver 7 outputs a sound signal transmitted from the control unit 10 as a voice. The microphone 8 converts the voice of the user and the like into the sound signal to transmit it to the control unit 10.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. The storage unit 9 may be configured as a combination of the non-transitory storage medium such as a memory card and a reading device of the storage medium. The storage unit 9 stores a mail program 9A, a browser program 9B, and a lock screen control program 9C. The storage unit 9 may further store an application program for executing an application such as a text editor, an image viewer, a scheduler, and so on. The storage unit 9 may also store other programs and data such as an operating system program for implementing the fundamental functions of the mobile phone 1 and the address book data. The storage unit 9 stores a lock screen data 9D as data.

The mail program 9A provides a function for implementing an electronic mail function. The browser program 9B provides a function for implementing the WEB browsing function. The lock screen control program 9C provides a function for controlling the display unit 2B that displays the lock screen, a function for setting and cancelling the lock screen, and so on.

The lock screen data 9D contains the data of various images for executing the lock screen control program 9C for display. The lock screen data 9D maintains the data such as objects, messages, and the like to be displayed in the lock screen. The lock screen refers to a screen that does not move to the idle screen before a predetermined operation is detected. That is, the lock screen is a screen that is displayed when it is in the locked state in which the various functions of the mobile phone 1 cannot be operated until the predetermined operation is inputted. The lock screen in the present embodiment displays an object that changes the screen based on the operation inputted to the area for detecting the predetermined operation. The idle screen refers to a screen in a state of standing by for the originating and incoming of a call, or a screen in a state of standing by for the start-up of an application program (so called home screen). In other words, the idle screen is a screen before the screen is changed to the operation screen of a plurality of applications that will be displayed on the display unit 2B by the control unit 10. The operation screen is a screen for providing the user with functions of the applications of the mobile phone 1. The functions of the applications of the mobile phone 1 are, for example, a function for communication with other mobile phone, a function for transmitting and receiving mails, a photographing function by a camera of the mobile phone 1, an audio visual function, a text editor function, an image editor function, a schedule management function, and so on. For example, the user may preset a favorite image, a state display such as a clock, and the like for the background of the idle screen. The background of the idle screen is referred to also as a wall paper.

The control unit 10 is, for example, a CPU (Central Processing Unit) and controls the operation of the mobile phone 1 in an integrated manner to implement various functions. Specifically, while referring to the data stored in the storage unit 9 and the data loaded to the RAM 11 as needed, the control unit 10 executes the instruction included in the program stored in the storage unit 9 to control the display unit 2B, the communication unit 6, and so on and thereby implements the various functions. The program executed and the data referred to by the control unit 10 may be downloaded from a server by the communication through the communication unit 6.

The control unit 10 implements the electronic mail function by executing the mail program 9A, for example. The control unit 10 implements the WEB browsing function by executing the browser program 9B. The control unit 10 implements the function for controlling the display unit 2B that displays the lock screen, the function for setting and cancelling the lock screen, and so on by executing the lock screen control program 9C.

The RAM 11 is utilized as the storage area in which the instruction of the program executed by the control unit 10, the data referred to by the control unit 10, the calculation result by the control unit 10, and so on are temporarily stored.

Figure 3:
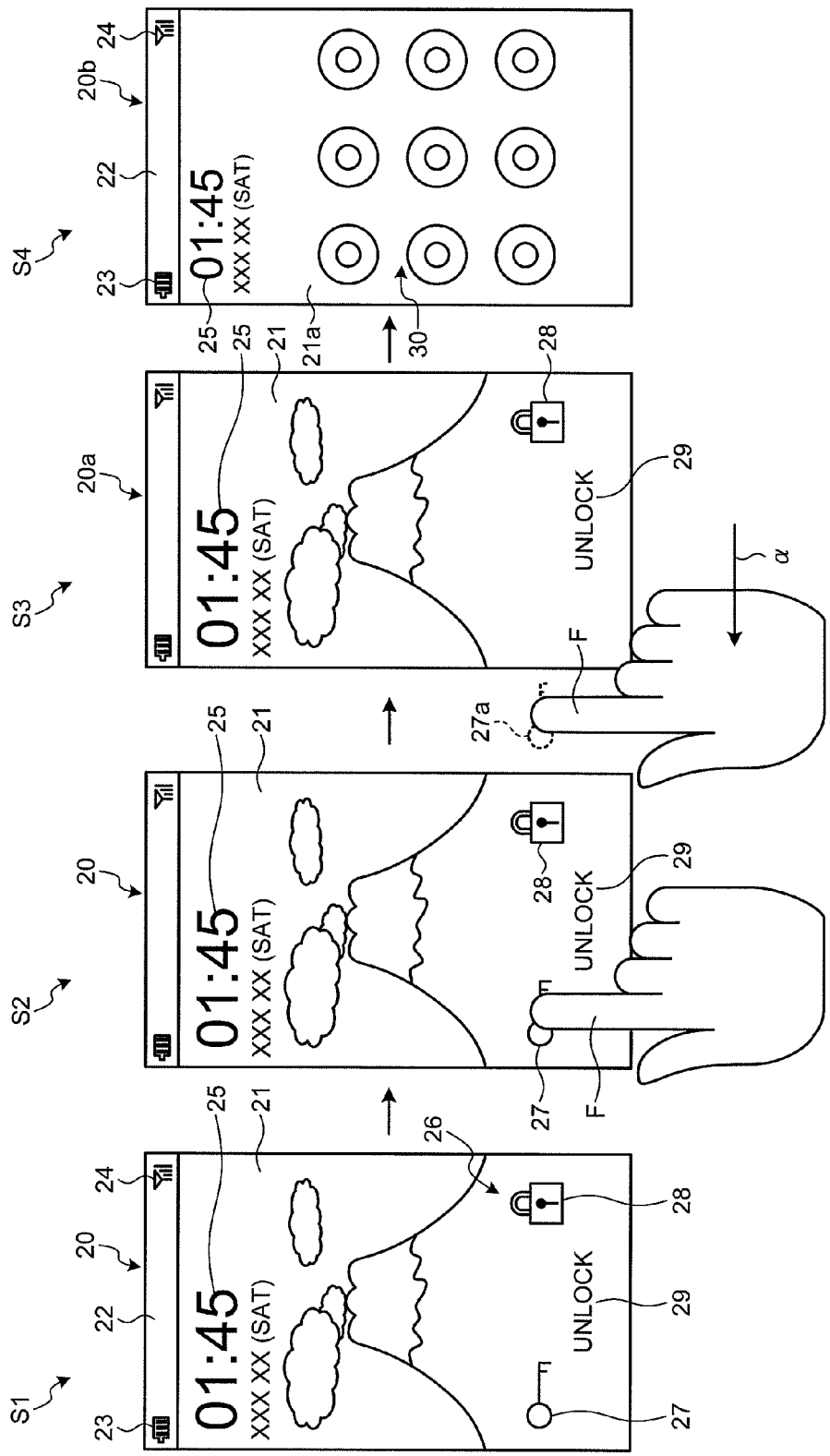
FIG. 3 is a schematic diagram illustrating an example of an operation of the mobile phone.
Figure 4:
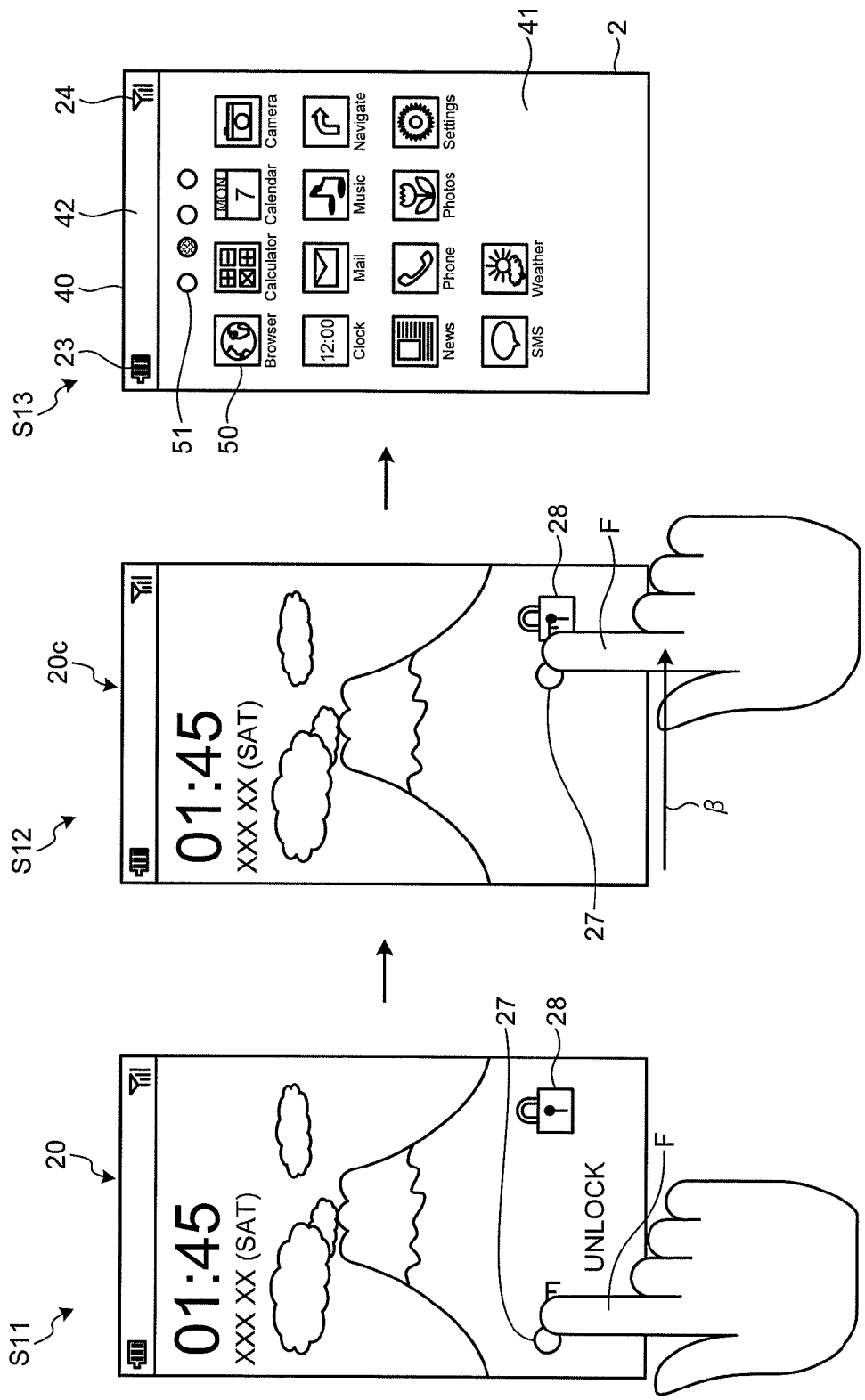
FIG. 4 is a schematic diagram illustrating an example of an operation of the mobile phone.
Figure 5:
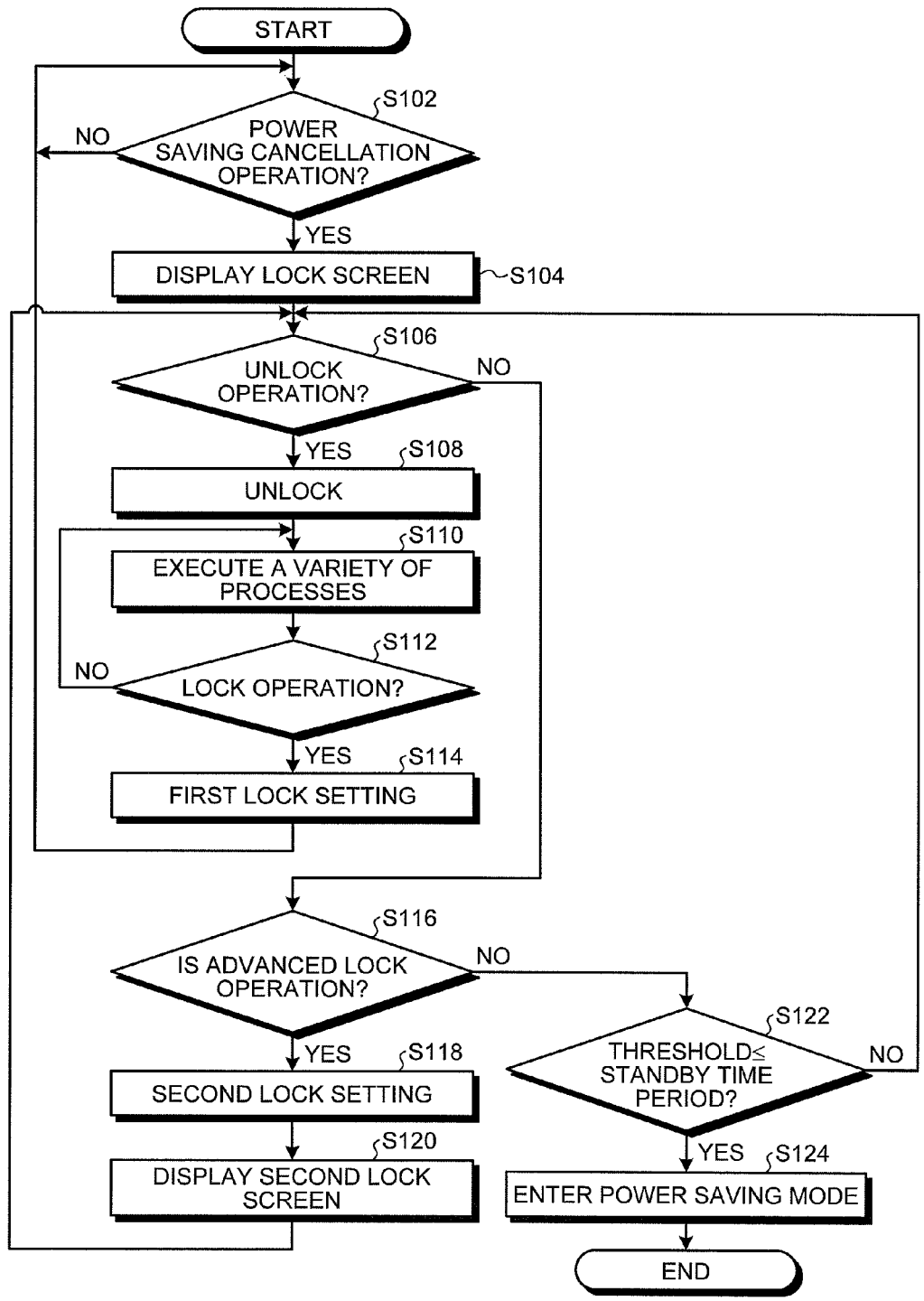
FIG. 5 is a flowchart illustrating an example of a process by the mobile phone.

Then, with referring to FIG. 3 to FIG. 5, described will be an example of the control that is executed by the control unit 10 of the mobile phone 1 described above. FIG. 3 is a schematic diagram illustrating an example of the operation of the mobile phone. FIG. 4 is a schematic diagram illustrating an example of the operation of the mobile phone. FIG. 5 is a flowchart illustrating an example of the process by the mobile phone.

By using FIG. 3 and FIG. 4, described will be an example of the operation that is executed by the mobile phone with the lock screen being displayed. First, by using FIG. 3, described will be the process executed when an advanced lock setting operation (a second contact operation, a second operation) is inputted with the mobile phone displaying the lock screen. The user inputs an operation to cause the lock screen to be displayed such as an operation for the recovery from the power saving mode (the mode in which the display unit 2B is turned off), for example. When having detected the operation for the recovery from the power saving mode (the mode in which the display unit 2B is turned off), for example, the mobile phone 1 of the present embodiment causes the lock screen 20 to be displayed as illustrated in Step S1. The lock screen 20 is the screen displayed in a locked state for reducing false detection.

In the lock screen 20 illustrated in Step S1 of FIG. 3, a clock image 25 and a group of objects 26 are arranged. The clock image 25 is an image for displaying the current date and time, and the displayed date and time changes with time. The clock image 25 is the image created by the application having a clock function. The group of objects 26 indicates that the displayed screen is in the locked state for reducing false operation, and is a collection of the objects to which the operation to cancel the locked state for reducing false operation is inputted, which has an object 27, an object 28, and a message 29. The locked state of Step S1 is the locked state for reducing false operation. The object 27 is an icon displayed with an image of a key. The object 28 is an icon displayed with an image of a lock. The message 29 is a character string "unlock", and implies that the group of objects 26 is the object for inputting the lock cancellation. In the group of objects 26 of the present embodiment, the object 27 is the object which can be operated, while the object 28 is the object which cannot be operated. When the sweep operation whose contact starting point is the display area of the object 27 is inputted by the user, the display position of the object 27 is moved according to the movement of the contact position of the sweep operation. In contrast, as for the object 28, its display position does not move even when the sweep operation whose contact starting point is the display area of the object 28 is inputted.

In the lock screen 20, the wall paper 21 is displayed behind the clock image 25 and the group of objects 26. Although the image of a mountain and clouds is used as the wall paper 21 in the present embodiment, the mobile phone 1 can display any image for the wall paper 21. The image used in the mobile phone 1 for the wall paper 21 is, for example, determined according to the user setting. The upper edge of the touch panel 2 is provided with the notification area 22. In the notification area 22, displayed are a residual quantity 23 that indicates the residual quantity of the battery, a radio wave level indicator 24 that indicates the electric field intensity of the radio wave for communication, and so on. As such, the notification area 22 is used for providing various notifications to the user. The notification area 22 may also be provided to other screens than the lock screen 20.

Then, with the lock screen 20 being displayed on the touch panel 2 of the mobile phone 1, the user causes the finger F to contact to the object 27, as illustrated in Step S2. When having detected the contact of the finger F at the touch sensor 2A of the touch panel 2, the mobile phone 1 enters a state where the object 27 displayed at the contact position of the finger F is designated, and then enters a state for causing the display position of the designated object 27 to move according to the movement of the contact position of the finger F.

After causing the finger F to contact to the display position of the object 27, the user inputs a sweep operation to move the finger F to outside the touch panel 2, as illustrated in Step S3. That is, while keeping the finger F contacting with the touch panel 2, the user moves the finger F in the direction of the arrow α, moves the finger F to the edge of the touch panel 2, and further moves the finger F to outside the touch panel 2. More specifically, the user moves the finger F in the direction of the arrow α such that the object designated by the finger F moves to the position where it turns to be the object 27a. When having detected the sweep operation inputted by the user to move the finger F contacting with the object 27 to outside the touch panel 2, the mobile phone 1 displays a lock screen 20a as illustrated in Step S3. The lock screen 20a is a screen without the object 27. That is, the mobile phone 1 moves the display position of the object 27 along the sweep operation, determines that the sweep operation is inputted toward outside the screen if the sweep operation continues to the end of the lock screen 20 of the touch panel 2, and moves the object 27 to outside the display area so as not to be displayed.

The mobile phone 1 then switches the locked state from the locked state for reducing false operation to the locked state for reducing unauthorized use and displays a lock screen 20*b* as illustrated in Step S4. That is, the mobile phone 1 stores the operation to move the object 27 to outside the lock screen 20 (the screen of the touch panel 2) as the operation to enter the locked state for reducing unauthorized use and, when having detected this operation, changes the locked state for reducing false operation to the locked state for reducing unauthorized use. In the lock screen 20*b*, the clock image 25 indicating the current time and the objects 30 are arranged.

In the lock screen 20*b*, the wall paper 21*a* is displayed behind the clock image 25 and the objects 30. In the present embodiment, a solid image is used as the wall paper 21*a*. The upper edge of the touch panel 2 is provided with the notification area 22. In the notification area 22, displayed are a residual quantity 23 that indicates the residual quantity of the battery, a radio wave level indicator 24 that indicates the electric field intensity of the radio wave for communication, and so on.

The objects 30 indicate that the displayed screen is in the locked state for reducing unauthorized use, and are the objects to which the operation to cancel the locked state for reducing unauthorized use is inputted. When an operation with a predetermined trace (mainly, a sweep operation) is inputted to the objects 30 with the screen 20*b* being displayed, the mobile phone 1 cancels the locked state for reducing unauthorized use. Various screens can be used for the screen displayed in the locked state for reducing unauthorized use. For the operation to cancel the locked state for reducing unauthorized use, various operations can be set that are different from the operation to cancel the locked state for reducing false operation. The operation to cancel the locked state for reducing unauthorized use may be more complex than the operation to cancel the locked state for reducing false operation. The operation to cancel the locked state for reducing unauthorized use may be the operation arbitrarily set by the user. When having cancelled the locked state for reducing unauthorized use, the mobile phone 1 may enter the locked state for reducing false operation or enter the state for displaying the home screen described later.

Then, by using FIG. 4, described will be the process that is executed when a lock cancellation operation (a first contact operation, a first operation) is inputted with the mobile phone displaying the lock screen. With the lock screen 20 being displayed on the touch panel 2 of the mobile phone 1, the user causes the finger F to contact to the object 27, as illustrated in Step S11. It is noted that the operation of Step S11 is the same as that of Step S2 as described above. When having detected the contact of the finger F by the touch sensor 2A of the touch panel 2, the mobile phone 1 enters a state where the object 27 displayed at the contact position of the finger F is designated, and then enters a state for causing the display position of the designated object 27 to move according to the movement of the contact position of the finger F.

After causing the finger F to contact to the display position of the object 27, the user inputs a sweep operation to move the finger F to the object 28, as illustrated in S12. That is, while keeping the finger F contacting with the touch panel 2, the user moves the finger F in the direction of the arrow β and moves the finger F to the position where the object 28 is displayed. As such, the user inputs the operation to overlap the object 27 with the object 28. When having detected the sweep operation inputted by the user to move the finger F in contacting with the object 27 up to the object 28, the mobile phone 1 displays a lock screen 20*c* illustrated in Step S12. The lock screen 20*c* is the screen in which the object 27 and the object 28 overlap each other. That is, the mobile phone 1 moves the display position of the object 27 along the sweep operation and, in response that the sweep operation reaches the object 28 of the touch panel 2, displays the object 27 overlapped on the object 28. In the present embodiment, the image in which the end of the key of the object 27 is inserted into the keyhole of the lock of the object 28 is displayed.

The user then removes the finger F from the touch panel 2 with the object 27 and the object 28 overlapping, that is, finishes the sweep operation at the area where the object 28 is displayed. When having detected that the sweep operation finished at the area where the object 28 is displayed, the mobile phone 1 cancels the locked state for reducing false operation and displays a home screen 40 as illustrated in Step S13. That is, the mobile phone 1 stores the operation to move the object 27 to the object 28 as the cancellation operation of the locked state for reducing false operation and, upon detecting this operation, cancels the locked state for reducing false operation.

In the home screen 40 illustrated in Step S13, multiple objects 50 are arranged. Respective objects 50 are associated with particular functions in advance. Upon detecting a particular gesture (for example, tap) to the object 50, the mobile phone 1 executes the function associated with that object 50. For example, in response that a tap to an object 50 associated with a program installed in the mobile phone 1 is detected, the mobile phone 1 executes the program associated with that object 50.

The objects 50 include the image indicating the associated function and the character string indicating the associated function. The objects 50 are arranged according to a predetermined rule. A wall paper 41 is displayed behind the objects 50. Although the solid wall paper is used as the wall paper 41 in the example of FIG. 4, the mobile phone 1 may display any image as the wall paper 41. The image used in the mobile phone 1 as the wall paper 41 may be determined according to the user setting, for example. It is noted that the objects are not limited to the combination of an image and a character string. For example, the objects 50 may not include the character string or may not include the image.

The home screen 40 includes a plurality of pages. One of the pages is displayed on the touch panel 2. The page currently displayed on the touch panel 2 can be identified by an indicator 51 displayed above the objects 50. The indicator 51 includes symbols corresponding to respective pages. The symbol corresponding to the currently displayed page of the symbols included in the indicator 51 is displayed in a different manner from other symbols.

In the example illustrated in Step S13, the indicator 51 including four symbols is displayed. This indicates that the home screen 40 is divided into four pages. In the example illustrated in Step S13, the second symbol from the right is displayed in a different manner from other symbols. This indicates that the second page from the right is currently displayed.

Upon detecting a particular gesture (for example, a flick to the right or the left, or a sweep to the right or the left), the mobile phone 1 switches the page displayed on the display unit 2B of the touch panel 2. For example, upon the detection of the flick to the right, the mobile phone 1 switches the page displayed on the touch panel 2 to the left page by one page.

Upon the detection of the flick to the left, the mobile phone 1 switches the page displayed on the touch panel 2 to the right page by one page.

The upper end of the touch panel 2 is provided with a notification area 42 similarly to the notification area 22 of the lock screen 20. In the notification area 42, displayed are a residual quantity 23 that indicates the residual quantity of the battery, a radio wave level indicator 24 that indicates the electric field intensity of the radio wave for communication, and so on. As such, the notification area 42 is used for providing various notifications to the user.

It is noted that the home screen 40 of the present embodiment is an example, and therefore the form of each element, the position of each element, the number of pages that the home screen 40 includes, the way of making each operation on the home screen 40, and so on are not necessarily the same as described above.

Then, by using the flowchart of FIG. 5, the process in the mobile phone 1 will be described. The processing procedure illustrated in FIG. 5 is repeatedly executed based on the function provided by the lock screen control program 9C. The process illustrated in FIG. 5 is executed while the locked state has been set by the user and the power saving mode has been entered.

When the locked state has been set by the user and the power saving mode has been entered, the control unit 10 of the mobile phone 1 determines whether or not an input of a power saving cancellation operation is detected, at Step S102. In the present embodiment, the power saving cancellation operation is a click operation detected through the input unit 3 (such as the first button 3A). That is, in the present embodiment, the click operation by the user causes the power saving sate to be cancelled.

When it is determined that the input of the power saving cancellation operation through the operating unit is detected in Step S102 (Step S102, Yes), the control unit 10 cancels the power saving state and displays the set lock screen on the display unit 2B at Step S104. The control unit 10 cancels the power saving state at Step S104 and enters a state where the contact detection to the touch panel 2 can be made.

When it is determined that the input of the power saving cancellation operation through the operating unit has not been detected in Step S102 (Step S102, No), the control unit 10 proceeds to Step S102 and executes the process explained in Step S102. As such, the control unit 10 repeats the process of Step S102 until it is determined that the input of the power saving cancellation operation is detected. That is, the control unit 10 is in the power saving state until the power saving is cancelled. As the set lock screen, either the lock screen of the locked state for reducing false operation or the lock screen of the locked state for reducing unauthorized use is displayed. In the present embodiment, the setting for the locked state for reducing false operation is defined as the first lock setting and the setting for the locked state for reducing unauthorized use is defined as the second lock setting.

After displaying the lock screen at Step S104, the control unit 10 determines whether or not the input of the lock cancellation operation, that is, whether or not the unlock operation is detected through the operating unit, at Step S106. In the present embodiment, in the case of the locked state for reducing false operation, the lock cancellation operation is a sweep operation to move the object of the key on the lock screen to the object of the lock. In the case of the locked state for reducing unauthorized use, the lock cancellation operation is the operation to input an operation having a predetermined trace.

Then, when it is determined that the input of the lock cancellation operation is detected through the operating unit at Step S106 (Step S106, Yes), the control unit 10 cancels the locked state, at Step S108. It is noted that cancelling the locked state refers to switching the display from the lock screen displayed in the display unit 2B to, for example, the home screen or the screen that has been displayed before the power saving.

After cancelling the locked state at Step S108, the control unit 10 performs a variety of operations at Step S110. Specifically, the control unit 10 executes the process corresponding to the operation detected through the touch sensor 2A or the input unit 3 (for example, an execution of an application corresponding to an object displayed on the home screen, a communication, a mail transmission and reception, a photographing, and so on).

After executing the operation at Step S110, the control unit 10 determines whether or not the input of the lock setting operation is detected through the operating unit, at Step S112. In the present embodiment, the lock setting operation refers to the click operation detected through the input unit 3 (such as the first button 3A). In addition, the control unit 10 may be set in advance so as to enter the locked state if the operation input has not been detected for a predetermined time period through the operating unit (the touch sensor 2A and the input unit 3). That is, such setting may be possible that, if the time duration in which no operation input is detected through the operating unit exceeds the predetermined time period, it is determined that the lock setting operation is inputted. It is noted that the control unit 10 may execute the process of Step S112 for every predetermined time period, or may execute it for every time an operation is detected through the operating unit detects an operation.

When it is determined that the input of the lock setting operation is detected through the operating unit at Step S112, the control unit 10 sets the mobile phone 1 to the first lock setting, at Step S114. The first lock setting is a setting to execute the locked state for reducing false operation as a locked state. After executing the first locked state at Step S114, the control unit 10 enters the power saving state of the screen and proceeds to Step S102. That is, upon detecting the click operation through the input unit 3 in Step S112, the control unit 10 of the present embodiment sets the first lock setting at Step S114 and then stops the display of the screen to enter the power saving state. Then, the mobile phone 1 proceeds to Step S102 and again executes the process of Step S102. The control unit 10 may select the locked state to be set according to the lock setting operation detected through the input unit 3. For example, the control unit 10 may set the first lock setting if a click operation as the lock setting operation is detected through the input unit 3, while the control unit 10 may set the setting (the second lock setting described later) for entering the locked state for reducing unauthorized use instead of the locked state for reducing false operation if a long click operation of the long press for a predetermined time period is detected. After setting the locked state at Step S114, the control unit 10 of the mobile phone 1 stops the display of the screen.

When it is determined that the input of the lock setting operation has not detected through the operating unit at Step S112 (Step S112, No), the control unit 10 proceeds to Step S110 and repeats the process until it is determined that the input of the lock setting operation is detected at Step S112. That is, after setting the application associated with the setting screen and before performing the lock setting operation, the user may utilize other functions (the communication function, the mail transmission and reception function, the photographing function, and so on) of the mobile phone 1, for example.

When it is determined that there is no input of the lock cancellation operation at Step S106 (Step S106, No), the control unit 10 determines whether or not an input of an advanced lock setting operation is detected through the operating unit, that is, whether or not the advanced lock setting operation is detected. The advanced lock setting of the present embodiment refers to the setting for entering the locked state for reducing unauthorized use. In the present embodiment, the operation is the sweep operation to move the object on the lock screen to outside the screen that is detected through the touch sensor 2A. In addition, when the locked state is the locked state for reducing unauthorized use, the determination of Step S116 will always result in that the advanced lock setting operation is not detected (No).

When it is determined that the input of the advanced lock setting operation is inputted through the operating unit at Step S116 (Step S116, Yes), the control unit 10 applies the second lock setting, at Step S118. The second lock setting is the setting for executing the locked state for reducing unauthorized use as a locked state. Upon executing the second lock setting at Step S118, the control unit 10 displays on the display unit 2B the second lock screen, that is, the screen of the locked state for reducing unauthorized use and proceeds to Step S106.

When it is determined that the input of the advanced lock setting operation is not detected through the operating unit at Step S116 (Step S116, No), the control unit 10 determines whether or not the standby time period in which no input for any operation is detected through the operating unit is longer than or equal to a predetermined threshold, at Step S122.

When it is determined that the standby time period is longer than or equal to the predetermined threshold at Step S122 (Step S122, Yes), the control unit 10 enters the power saving mode at Step S124 and completes the process. When it is determined that the standby time period is less than the predetermined threshold at Step S122 (Step S122, No), the control unit 10 proceeds to Step S106.

As mentioned, when the mobile phone 1 detects the advanced lock setting operation set in advance (in the present embodiment, the operation to sweep the key object toward outside the screen) with the lock screen of the locked state for reducing false operation being displayed, the mobile phone 1 enters the locked state for reducing unauthorized use. Thereby, the user can set the locked state with the locked state for reducing unauthorized use by only inputting the simple operation with the lock screen of the locked state for reducing false operation being displayed. Thereby, the user can apply the locked state for reducing false operation as the usual state and apply the locked state for reducing unauthorized use only when it is necessary. For example, the user can apply the locked state for reducing false operation when carrying the mobile phone 1, and apply the locked state for reducing unauthorized use when leaving from the mobile phone 1.

In the mobile phone 1, the operation to switch the locked state can be performed on the lock screen, so that the switch of the locked state can be easily made. This allows the user to easily switch the locked state even when intending to quickly switch the locked state to the locked state for reducing unauthorized use. Moreover, the operation can be made on the lock screen, which can make it difficult for the third party to notice that the locked state has been switched.

In the mobile phone 1 of the present embodiment, the operation to sweep the key object toward outside the screen is the advanced lock setting operation, that is, the operation to switch the locked state, so that the operation to discard the key can be set as the switching operation of the locked state. This allows the user to understand that the operation to discard the key is the operation to enter the locked state for reducing unauthorized use, the lock cancellation of which is more difficult, so that the intuitive operation will be possible.

In the mobile phone 1 of the present embodiment, both the lock cancellation operation and the advanced lock setting operation are the operation made to the key object, that is, the start points for both operations are the same, so that the inputs of the operation to the lock setting can be aggregated, which allows for easier memorization of the operations. In the mobile phone 1 of the present embodiment, the end points of the lock cancellation operation and the advanced lock setting operation are different in position, that is, the end point (goal point) of the lock cancellation operation is the object of the lock while the end point (goal point) of the advanced lock setting operation is outside the screen (in actual, the edge of the screen), so that the respective operations are ensured to be detected as the different operations.

Figure 6:
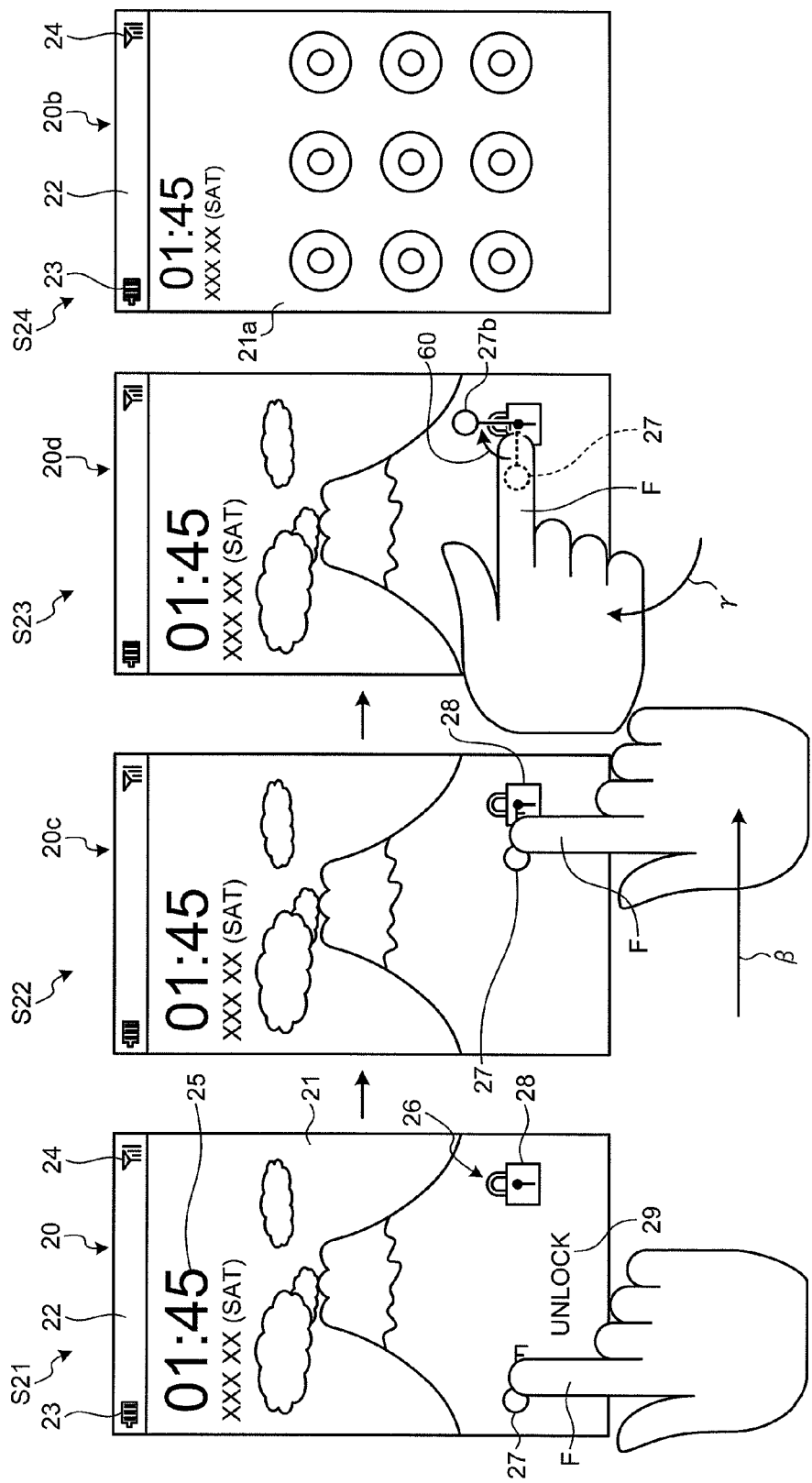
FIG. 6 is a schematic diagram illustrating an example of an operation of the mobile phone.

It is noted that the lock cancellation operation and the advanced lock setting operation are not limited to the above embodiment, and various operations can be used. Below, by using FIG. 6, another example of the advanced lock setting operation will be described. FIG. 6 is a schematic diagram illustrating an example of the operation of the mobile phone.

The user causes the finger F to contact to the object 27 as illustrated in Step S21 with the lock screen 20 being displayed on the touch panel 2 of the mobile phone 1. The operation of Step S21 is the similar operation to the Step S2 as described above. When detecting the contact by the finger F at the touch sensor 2A of the touch panel 2, the mobile phone 1 enters the state where the object 27 displayed at the contact position by the finger F is designated and enters the state for moving the display position of the object 27 designated corresponding to the movement of the contact position of the finger F.

After causing the finger F to contact to the display position of the object 27, the user inputs the sweep operation to move the finger F to the object 28 as illustrated in Step S22. That is, the user moves the finger F in the direction of the arrow β while keeping the finger F in contact with the touch panel 2, and moves the finger F to the position where the object 28 is displayed. As such, the user inputs the operation to overlap the object 27 with the object 28. When detecting the sweep operation inputted by the user for moving the finger F in contacting with the object 27 to the object 28, the mobile phone 1 displays the lock screen 20c illustrated in Step S22. The lock screen 20c is the screen in which the object 27 and the object 28 overlap each other. That is, the mobile phone 1 moves the display position of the object 27 along the sweep operation and, in response that the sweep operation reaches the object 28 of the touch panel 2, displays the object 27 overlapped on the object 28. In the present embodiment, the image in which the end of the key of the object 27 is inserted into the keyhole of the lock of the object 28 is displayed.

With the object 27 and the object 28 being overlapping each other, the user then rotates the finger F by 90 degrees in the clockwise direction (γ direction) within the area where the object 27 and the object 28 are displayed with overlapping each other. That is, the user inputs the operation to rotate the finger by 90 degrees with keeping the contact position being substantially the same area. When detecting the operation of rotating the finger F in contact to the object 27 inputted by the user, the mobile phone 1 displays a lock screen 20d illustrated in Step S23. The lock screen 20d is the screen including the object 27b that has been rotated from the object 27 by 90 degrees in the direction of the arrow 60 (clockwise). That is, the mobile phone 1 rotates the object 27 along the rotation operation and displays the object 27b which the object 27 has been rotated by 90 degrees with overlapping it on the object 28.

The user then removes the finger F from the touch panel 2, that is, finishes the operation at the area, as the end point, where the object 28 is displayed and at the position where the finger F has been rotated by 90 degrees. When detecting that the sweep operation finished at the area as the end point where the object 28 is displayed and the finger F has been rotated by 90 degrees in the area where the object 28 is displayed, the mobile phone 1 switches the locked state from the locked state for reducing false operation to the locked state for reducing unauthorized use and displays the lock screen 20b illustrated in Step S24. That is, the mobile phone 1 stores, as the operation to enter the locked state for reducing unauthorized use, the operation to overlap the object 27 on the object 28 and then rotating the object 27 (finger F) by 90 degrees in the position where the object 27 and the object 28 overlap and, upon detecting such an operation, changes the locked state for reducing false operation to the locked state for reducing unauthorized use.

In the mobile phone 1, the operation to rotate the object 27 (finger F) by 90 degrees at the position where the object 27 and the object 28 overlap may be set as the operation to enter the locked state for the unauthorized use reduction. In the mobile phone 1, the operation to cause the object of the key to rotate at the part of the lock hole of the object of the lock is set as the operation to enter the locked state for reducing unauthorized use, so that one can understand that the operation to insert the key into the lock hole and rotate it, that is, the operation that simulates the operation performed in locking is the operation to enter the locked state for reducing unauthorized use, the lock cancellation of which is more difficult. This allows for the intuitive operation.

In the mobile phone 1, the advanced lock setting operation (the second contact operation, the second operation) includes the operation to rotate the finger F, which makes easier to distinguish it from the lock cancellation operation (the first contact operation, the first operation).

In the mobile phone 1, the lock cancellation operation (the first contact operation, the first operation) and the advanced lock setting operation (the second contact operation, the second operation) may be different from each other in the trace. That is, in the mobile phone 1, by differentiating the trace of the lock cancellation operation (the first contact operation, the first operation) and the trace of the advanced lock setting operation (the second contact operation, the second operation), the identification between the lock cancellation operation and the advanced lock setting operation can be easily detected. The lock cancellation operation (the first contact operation, the first operation) and the advanced lock setting operation (the second contact operation, the second operation) are of different operation in their trace, so that the two operations can be identified even if the start points and the end points of these operations are the same.

Figure 7:
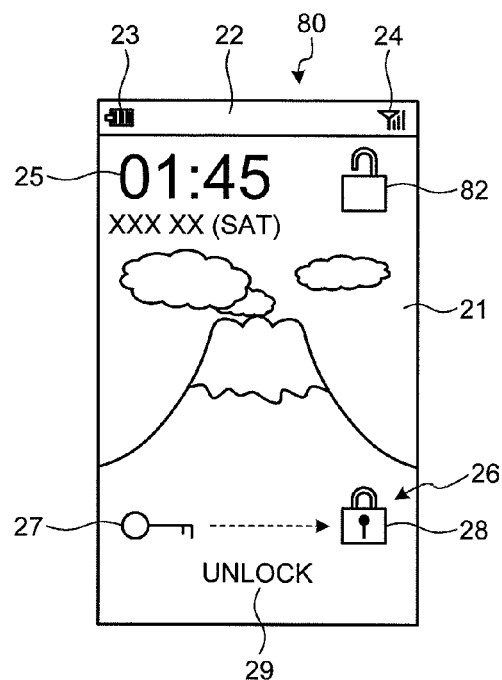
FIG. 7 is a schematic diagram illustrating an example of a lock screen.
Figure 8:
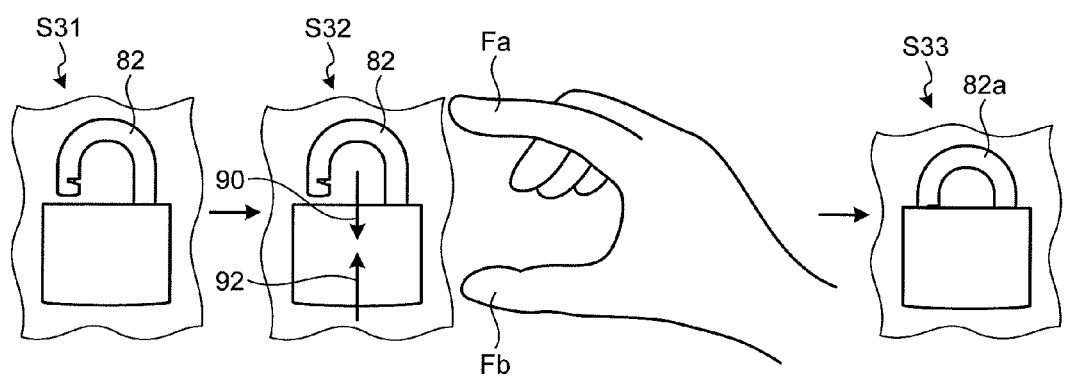
FIG. 8 is a schematic diagram illustrating an example of an operation of the mobile phone.

In the above embodiment, although the start point (from which the contact is started) of the advanced lock setting operation is the same as the start point of the lock cancellation operation, that is, the operation to operate the object to be moved when the lock cancellation is inputted is defined as the advanced lock setting operation, it is not limited to this. Below, another example will be described by using FIG. 7 and FIG. 8. FIG. 7 is a schematic diagram illustrating an example of the lock screen. FIG. 8 is a schematic diagram illustrating an example of the operation of the mobile phone.

In a lock screen 80 illustrated in FIG. 7, the clock image 25, the group of objects 26, and an object 82 are arranged. The clock image 25 is the image for displaying the current date and time and the displayed date and time changes with time. The clock image 25 is the image created by the application having the clock function. The group of objects 26 indicates that the displayed screen is in the locked state for reducing false operation, and is the collection of the objects to which the operation to cancel the locked state for reducing false operation is inputted, which has the object 27, the object 28, and the message 29. The group of objects 26 includes the similar function to the group of objects 26 of each embodiment described above.

In the lock screen 80, the wall paper 21 is displayed behind the clock image 25, the group of objects 26, and the object 82. The upper edge of the touch panel 2 is provided with the notification area 22. In the notification area 22, a residual quantity 23 that indicates the residual quantity of the battery, a radio wave level indicator 24 that indicates the electric field intensity of the radio wave for communication, and so on.

The object 82 is the image of a lock, in particular, a padlock, and is the object indicating that the screen is in the locked state, that is, the locked state display object. The mobile phone 1 displays the object 82 on the touch panel 2 when the mobile phone 1 is in the locked state. The object 82 will be the different display between the case of the locked state for reducing false operation and the case of the locked state for reducing unauthorized use. Regarding this point, the description is provided below along with the advanced lock setting operation.

Then, by using FIG. 8, described will be an example of the advanced lock setting operation when the lock screen 80 is displayed. In the mobile phone 1, when the lock screen 80 is displayed, a predetermined operation inputted to the object 82 may be defined as the advanced lock setting operation.

The mobile phone 1 displays the object 82 illustrated in Step S31 in the case of the locked state for reducing unauthorized use. The object 82 is the image of the state that the lock is released, that is, the lock is unlocked.

The user causes a finger Fa and a finger Fb to contact to the object 82 as illustrated in Step S32, with the object 82 being displayed on the screen 80 of the touch panel 2 of the mobile phone 1. After causing the finger F to contact to the display position of the object 82, the user moves the finger Fa and the finger Fb in the direction to be closer while keeping the finger Fa and the finger Fb in contact with the touch panel 2. That is, the finger Fa is moved to the direction (the direction of the arrow 90) toward the finger Fb, and the finger Fb is moved to the direction (the direction of the arrow 92) toward the finger Fa.

The user then removes the fingers Fa and Fb from the touch panel 2 to finish the operation. When detecting the contact operation with two points in the area where the object 82 is displayed and then detects the operation in which the contact positions of the two points are getting closer, the mobile phone 1 switches the locked state from the locked state for reducing false operation to the locked state for reducing unauthorized use and displays an object 82a illustrated in Step S33. The object 82a is the image of the state that the lock is locked. That is, the mobile phone 1 stores the pinch-in operation made to the object 82 as the operation to enter the locked state for reducing unauthorized use and, upon detecting such an operation, changes the locked state for reducing false operation to the locked state for reducing unauthorized use.

As such, in the mobile phone 1, the operation made to the different object from the object to be inputted for the lock cancellation operation can be defined as the advanced lock setting operation.

In the mobile phone 1, the object to be operated is the object 82 of the unlocked image in the case of the locked state for reducing false operation, while it is the object 82*a* of the locked image in the case of the locked state for reducing unauthorized use, which makes it easier to know the locked state.

In the mobile phone 1, the advanced lock setting operation is the pinch-in operation to the objects 82 and 82*a* as illustrated in FIG. 8, so that the operation simulating the operation to shut the lock can be defined as the advanced lock setting operation. This allows the user to understand that the operation simulating the operation to shut the lock is the operation to enter the locked state for reducing unauthorized use that makes it more difficult to cancel the lock, which allows for the intuitive operation.

The advanced lock setting operation is not limited to the operation simulating the operation to shut the lock, rather, may be various operations. The advanced lock setting operation may be the operation that implies to change the state of the object indicating the locked state (locked state display object). As such, the advanced lock setting operation may be the operation implying to change the state of the locked state display object, or the operation implying to change the state where it is more difficult to cancel the locked state display object, so that the user can intuitively realize the advanced lock setting operation, which allows for the improved operability.

In the mobile phone 1 of the above embodiment, although the advanced lock setting operation is the operation to the object 82 of the lock displayed independently from the group of objects 26, the advanced lock setting operation may be the similar operation to the object 82 of the lock of the group of objects 26.

Although the mobile phone 1 displays both the group of objects 26 and the object 82 on the touch panel 2 in the examples of FIG. 7 and FIG. 8, the mobile phone 1 may display the object 82 only without displaying the group of objects 26. In this case, the lock cancellation operation will be the different operation than in the above described embodiment (for example, a long press of a particular button of the input unit 3, a sweep operation at any position).

In the above described embodiment, although both the lock cancellation operation (the first contact operation, the first operation) and the advanced lock setting operation (the second contact operation, the second operation) are operation to the object in order to have the intuitive judgment of the operation input and for the easier understanding of the input position of the operation, they are not limited to them. The lock cancellation operation (the first contact operation, the first operation) and the advanced lock setting operation (the second contact operation, the second operation) may be any contact operation of the input to something other than the object.

The advantages of one embodiment of the invention are that, with a simple operation, the setting of the locked state can be switched from the locked state for reducing false operation to the locked state for reducing unauthorized use.

What is claimed is:

1. A mobile electronic device comprising:
   a display unit for displaying a lock screen;
   an operating unit for receiving an input of an operation; and
   a control unit for cancelling a first locked state when an input of a first operation is detected through the operating unit while the lock screen is displayed on the display unit, and entering a second locked state when an input of a second operation is detected through the operating unit while the lock screen is displayed on the display unit,
   wherein the first operation and the second operation are contact operations that start from a contact to a same location, respectively, and
   wherein the lock screen includes an object, and the first operation and the second operation start from the contact to the display area of the object, respectively.

2. The mobile electronic device according to claim 1, wherein
   the first locked state is a locked state for reducing false operation, and
   the second locked state is a locked state for reducing unauthorized use.

3. The mobile electronic device according to claim 1, wherein
   a control unit is configured to cancel the second locked state when an input of a different operation from the first operation is detected through the operating unit.

4. The mobile electronic device according to claim 1, wherein
   a control unit is configured to display a first lock screen on the display unit in the first locked state, and to display a second lock screen on the display unit in the second locked state.

5. The mobile electronic device according to claim 1, wherein
   the second locked state requires more complex operation to be canceled than the first locked state.

6. The mobile electronic device according to claim 1, wherein
   the first operation is an operation to sweep on a trace after the contact to the display area, and
   the second operation is an operation to sweep on a trace different from that of the first operation after the contact to the display area.

7. The mobile electronic device according to claim 1, wherein
   the first operation is an operation to sweep to a set goal point after the contact to the display area, and
   the second operation is an operation to sweep to a different point from the goal point.

8. The mobile electronic device according to claim 7, wherein
   the second operation is an operation to move the object toward outside the lock screen.

9. The mobile electronic device according to claim 1, wherein
   the second operation is an operation to rotate the object after the contact to the display area.

10. The mobile electronic device according to claim 1, wherein
    the lock screen displays a locked state display object indicating the locked state, and
    the second operation is an operation to imply to change a state of the locked state display object.

11. The mobile electronic device according to claim 1, wherein,
    the control unit is configured to display the lock screen on the display unit when an operation is detected through the operating unit in a power saving state where no image is displayed on the display unit.

12. A control method of a mobile electronic device including a display unit and an operating unit, the control method comprising:

displaying a lock screen on the display unit in a first locked state;

detecting an operation through the operating unit while displaying the lock screen on the display unit;

cancelling the first locked state when an input of a first operation is detected at the detecting; and entering a second locked state when an input of a second operation is detected at the detecting, wherein the first operation and the second operation are contact operations that start from a contact to a same location, respectively, and wherein the lock screen includes an object, and the first operation and the second operation start from the contact to the display area of the object, respectively.

13. The control method according to claim 12, wherein the first locked state is a locked state for reducing false operation, and the second locked state is a locked state for reducing unauthorized use.

14. The control method according to claim 12, further comprising canceling the second locked state when an input of a different operation from the first operation is detected through the operating unit.

15. A non-transitory storage medium that stores a control program for causing, when executed by a mobile electronic device including a display unit and an operating unit, the mobile electronic device to execute:

displaying a lock screen on the display unit in a first locked state;

detecting an operation through the operating unit while displaying the lock screen on the display unit;

cancelling the first locked state when an input of a first operation is detected at the detecting; and entering a second locked state when an input of a second operation is detected at the detecting, wherein the first operation and the second operation are contact operations that start from a contact to a same location, respectively, and wherein the lock screen includes an object, and the first operation and the second operation start from the contact to the display area of the object, respectively.

* * * * *